US011486356B2

(12) United States Patent
Holliday, III et al.

(10) Patent No.: US 11,486,356 B2
(45) Date of Patent: Nov. 1, 2022

(54) SYSTEM AND METHOD FOR CONTROLLING A WIND TURBINE

(71) Applicant: General Electric Company, Schenectady, NY (US)

(72) Inventors: Cornelius Edward Holliday, III, Forest, VA (US); Fernando Arturo Ramirez Sanchez, Salem, VA (US); Mathew Doyle Angel, Greenville, SC (US); Nathan Michael Killeen, Simpsonville, SC (US); Edward Wayne Hardwicke, Jr., Greenville, SC (US); Steven Wade Sutherland, Roanoke, VA (US); Robert Gregory Wagoner, Roanoke, VA (US); Govardhan Ganireddy, Salem, VA (US); Talha Irfanul Haque, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 148 days.

(21) Appl. No.: 17/002,954

(22) Filed: Aug. 26, 2020

(65) Prior Publication Data
US 2022/0065224 A1 Mar. 3, 2022

(51) Int. Cl.
F03D 7/04 (2006.01)
F03D 7/02 (2006.01)

(52) U.S. Cl.
CPC ........... *F03D 7/042* (2013.01); *F03D 7/0272* (2013.01); *F05B 2220/706* (2013.01); *F05B 2260/4023* (2013.01); *F05B 2270/335* (2013.01)

(58) Field of Classification Search
CPC ...... F03D 7/042; F03D 7/0272; F03D 7/0244; F03D 7/0264; F03D 15/00;
(Continued)

(56) References Cited

U.S. PATENT DOCUMENTS 8,932,017 B2 1/2015 Heidenreich et al.
2021/0340952 A1* 11/2021 Perley ................. F03D 7/047
(Continued)

FOREIGN PATENT DOCUMENTS

CA 2343876 A1 10/2002
CN 103323232 B 9/2017
(Continued)

OTHER PUBLICATIONS

European Search Report for EP Application No. 21192801.5, dated Dec. 15, 2021.

*Primary Examiner* — Igor Kershteyn
(74) *Attorney, Agent, or Firm* — Dority & Manning, P.A.

(57) ABSTRACT

A system and method are provided for controlling a wind turbine. Accordingly, a controller of the wind turbine detects a loss of traction of the slip coupling between a generator and a rotor of the drivetrain of the wind turbine. In response to detecting the loss of traction, the controller overrides a generator torque setpoint to alter a rotational speed of the generator. In response to the altered rotational speed of the generator, the traction of the slip coupling is increased. Increasing the traction of the slip coupling facilitates an application of generator torque to the drivetrain of the wind turbine.

20 Claims, 10 Drawing Sheets

(58) Field of Classification Search
CPC ........ F05B 2220/706; F05B 2260/4023; F05B 2270/335; F05B 2270/327; F05B 2270/337; F05B 2270/309; F05B 2270/1075
See application file for complete search history.

(56) References Cited

U.S. PATENT DOCUMENTS

| | | | |
|---|---|---|---|
| 2021/0363968 A1* | 11/2021 | Holliday, III | F03D 7/0244 |
| 2022/0170443 A1* | 6/2022 | Kavil Kambrath | H02J 3/24 |
| 2022/0170444 A1* | 6/2022 | Kavil Kambrath | F03D 7/0272 |

FOREIGN PATENT DOCUMENTS

| | | |
|---|---|---|
| CN | 110174264 A | 8/2019 |
| JP | H08312523 A | 11/1996 |
| JP | 2013238281 A | 11/2013 |
| WO | WO2012/023994 A1 | 2/2012 |

* cited by examiner

SYSTEM AND METHOD FOR CONTROLLING A WIND TURBINE

FIELD

The present disclosure relates in general to wind turbines, and more particularly to systems and methods for controlling wind turbines to increase traction of the slip coupling in the drivetrain.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an electrical grid.

In certain instances, it may be desirable to apply a braking torque with the generator to slow the rotor. For example, the wind turbine may experience an anomalous operational event, such as an overspeed condition, a portion of a rotor blade (or the rotor blade in its entirety) separating from the wind turbine, and/or other significant deviation from the normal operating state of the wind turbine. Such events may cause significant damage to the wind turbine, thereby making it desirable to slow the rotation of the rotor expeditiously. However, as the rotor is typically rotatably coupled to the generator via a slip coupling, the generation of torque by the generator and/or the inertia of the rotor may result in a loss of traction of the slip coupling when it may otherwise be desirable to apply a generator torque to the drivetrain. Accordingly, it may be desirable to control the generator torque so as to maintain, or regain, traction of the slip coupling in order to facilitate the application of generator torque to the drivetrain.

Thus, the art is continuously seeking new and improved systems and methods that address the aforementioned issues. As such, the present disclosure is directed to systems and methods for controlling a wind turbine to maintain or increase the traction of the slip coupling.

BRIEF DESCRIPTION

Aspects and advantages of the invention will be set forth in part in the following description, or may be obvious from the description, or may be learned through practice of the invention.

In one aspect, the present disclosure is directed to a method for controlling a wind turbine. The wind turbine may have a drivetrain which includes a rotor rotatably coupled to a generator via a slip coupling. The method may include detecting with a controller, which may be a controller of the wind turbine, a loss of traction of the slip coupling. In response to the detecting the loss of traction, the method may include overwriting, with the controller, a generator torque setpoint to alter a rotational speed of the generator. Additionally, the method may include increasing the traction of the slip coupling in response to the altered rotational speed of the generator. Thus, increasing the traction of the slip coupling facilitates an application of generator torque to the drivetrain of the wind turbine.

In an embodiment, the method may also include receiving, with the controller, an indication of at least one rotational speed from an encoder operably coupled to a high-speed shaft of the drivetrain and/or a generator rotor.

In an additional embodiment, the controller may be a converter controller. In such embodiments, the converter controller may have a sampling frequency of at least one sample every 200 microseconds.

In a further embodiment, the rotational speed(s) may be a rotational speed of the generator. Additionally, the method may include detecting, with the controller, the rotational speed at a first sampling interval. The method may also include detecting, with the controller, the rotational speed at a subsequent sampling interval. Further, the method may include detecting, with the controller, a speed change of the generator between the sampling intervals. The speed change may indicate a deceleration.

In an embodiment, the method may include determining, with the controller, a rate of deceleration of the generator based on the rotational speeds detected at the sampling intervals. The rate of deceleration may be greater than a rate of change threshold for the wind turbine.

In an additional embodiment, the drivetrain may include a low-speed shaft coupling the rotor to a gearbox. The gearbox may be coupled to the generator via the slip coupling. The method may also include detecting, with the controller, a rotational speed of the low-speed rotor shaft. Also, the method may include detecting, with the controller, a rotational speed of the generator. Additionally, the method may include detecting, with the controller, a ratio of the rotational speed of the generator to the rotational speed of the low-speed rotor shaft which is less than a speed correlation threshold.

In a further embodiment, the rotational speed(s) may be a rotational speed of the generator. The method may include receiving, with the controller, an indication of at least one operating parameter of the wind turbine. The at least one operating parameter(s) may include wind speed, wind direction, and/or a collective pitch angle of the rotor. The method may also include determining, with the controller, a correlation between the operating parameter(s) and the rotational speed of the generator which is below a corresponding correlation threshold.

In an embodiment, the method may include detecting, with the controller, a decrease in the inertia encountered by the generator. The inertia encountered by the generator may include at least a rotor inertia.

In an additional embodiment, the method may include receiving, with the controller, an indication of the rotational speed of the generator at a first sampling interval and a subsequent sampling interval. The indications may be indicative of a change in the rotational speed. The method may also include determining, with the controller, an air-gap torque of the generator at the sampling intervals. Additionally, the method may include determining, with the controller, a change in an inertia encountered by the generator based, at least in part, on the change in the rotational speed and the air-gap torque at the sampling intervals.

In a further embodiment, the method may include detecting, with the controller, the operating parameter(s) of the wind turbine. The operating parameter(s) may include at least one of wind speed, wind direction, or a collective pitch angle of the rotor. Additionally, the method may include detecting, with the controller, an output parameter of the wind turbine. The output parameter may include at least one of voltage, current, or power. Further, the method may include detecting, with the controller, a correlation between the output parameter and the operating parameter(s) which is below a correlation threshold.

In an embodiment, the method may include reducing the torque set point of the generator so as to facilitate an increase in the rotational speed of the generator. Increasing the rotational speed of the generator may facilitate increasing the traction of the slip coupling.

In an additional embodiment, the method may include increasing the rotational speed of the generator by motoring the generator.

In another aspect, the present disclosure is directed to a system for controlling a wind turbine. The system may include a generator rotatably coupled to a rotor via a slip coupling and a controller communicatively coupled to the generator. The controller may include at least one processor configured to perform a plurality of operations. The plurality of operations may include any of the operations and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
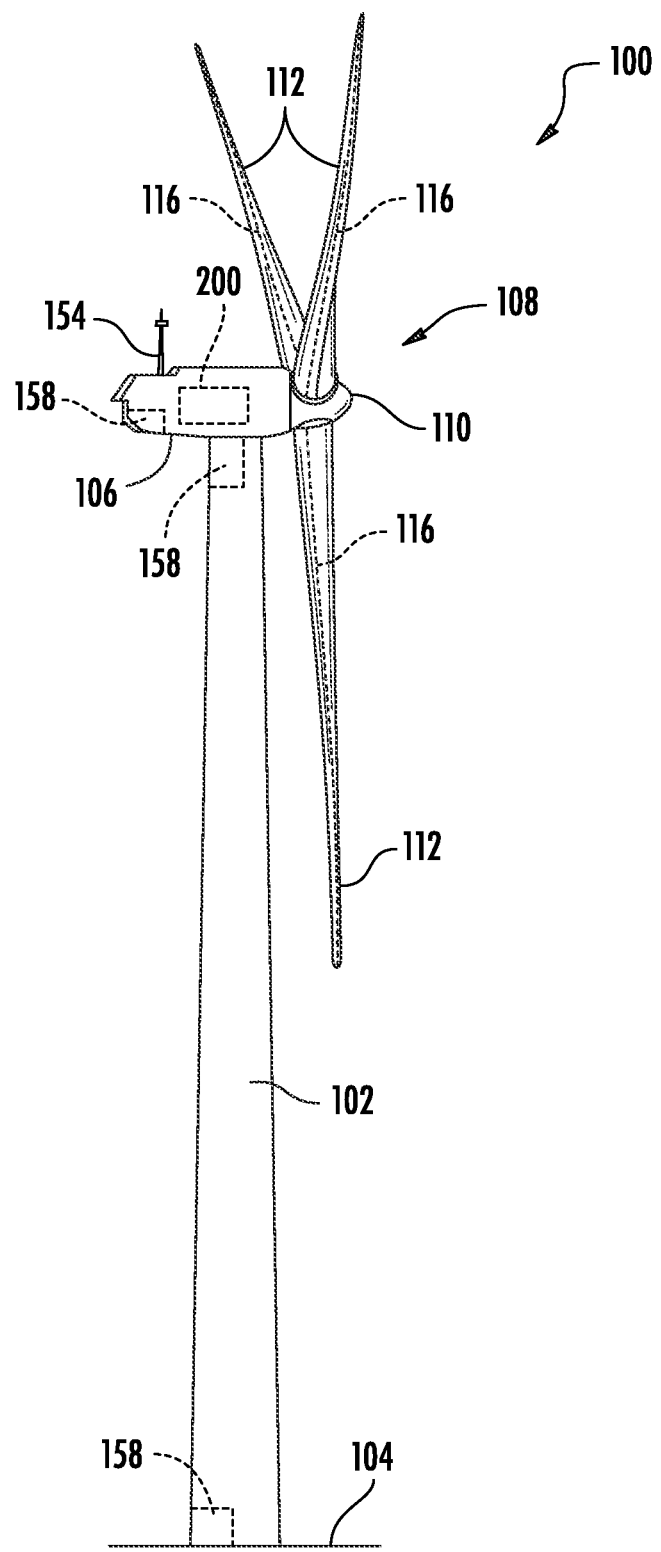
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a wind turbine so as to facilitate the application of generator torque to the drivetrain of the wind turbine. In particular, the present disclosure includes systems and methods which maintain, regain, and/or increase the traction of the slip coupling between the generator and the rotor of the wind turbine so that generator torque may be applied to the drivetrain. For example, the generator torque may be employed to slow the rotation of the rotor, such as may be required during an emergency braking of the wind turbine. Accordingly, the interaction of the generator torque and the inertia of the rotor may exceed the traction of the slip coupling and the slip coupling may begin to slip, as it is designed to do. The slipping of the slip coupling may be detected by, for example, a sudden deceleration of the generator, a rotational speed of the low-speed shaft which does not correlate to the rotational speed of the generator, a sudden drop in the inertia seen by the generator, a lack of correlation between the generator speed and the operating parameters of the wind turbine, and/or a lack of correlation between the output parameters of the wind turbine and the operating parameters. These conditions may, for example, indicate that the generator may no longer be operably coupled to the rotor of the wind turbine and, therefore, any torque generated by the generator may not affect the rotor. When the slip is detected by a controller of the wind turbine, the torque set point of the generator may be modified so that the generator speed may be changed, generally increased, in order to reduce the torque present in the slip coupling. When the generator reaches the proper rotational speed, the traction of the slip coupling may be increased so that the slipping of the slip coupling ceases. Once traction is reestablished, the torque from the generator may again be transmitted to the drivetrain of the wind turbine.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) of an electrical system 150 (FIG. 2) positioned within the nacelle 106 to permit electrical energy to be produced.

The wind turbine 100 may also include a controller 200 centralized within the nacelle 106. However, in other embodiments, the controller 200 may be located within any other component of the wind turbine 100 or at a location outside the wind turbine. Further, the controller 200 may be communicatively coupled to any number of the components of the wind turbine 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
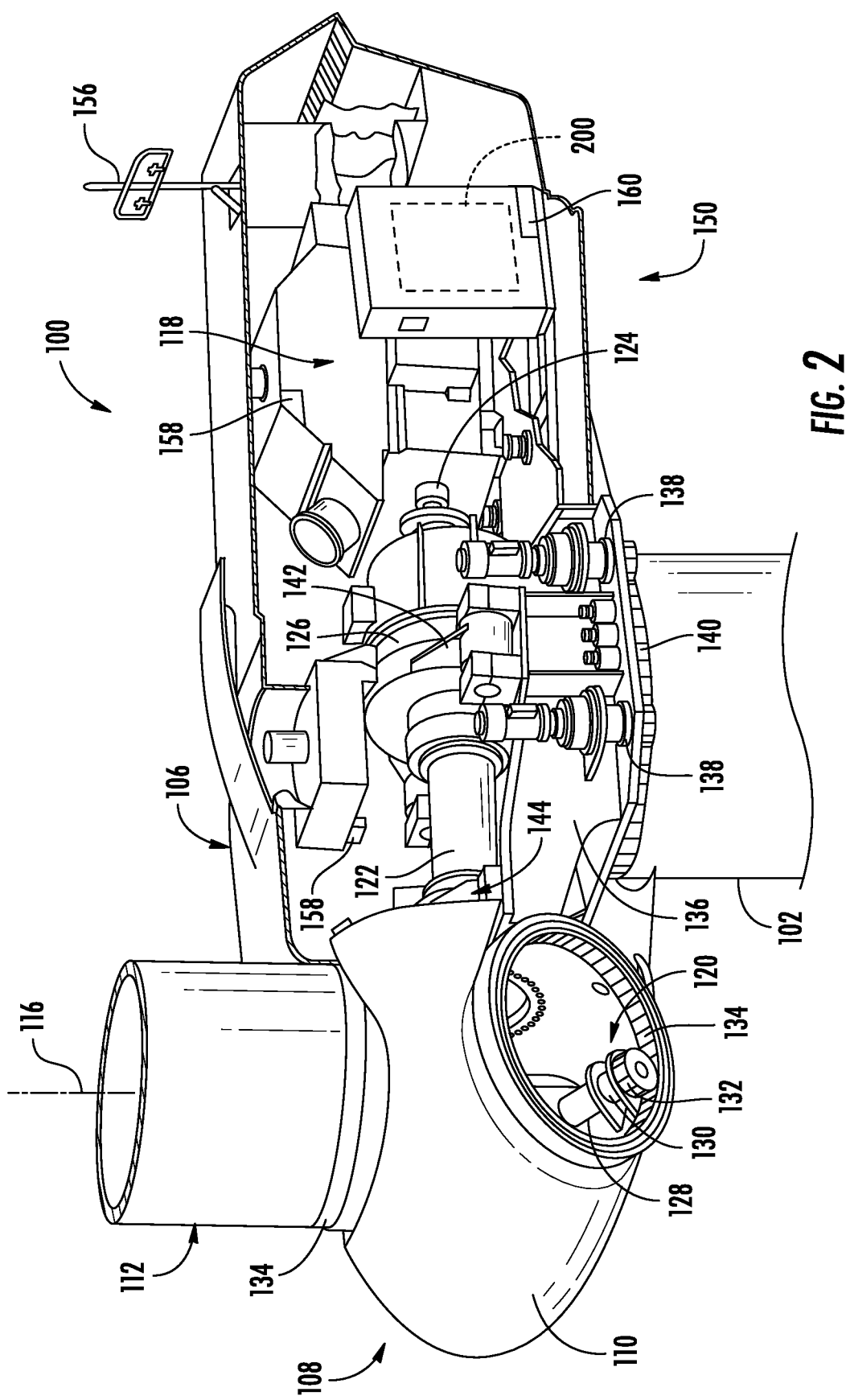
FIG. 2 illustrates a perspective, internal view of one embodiment of a nacelle of the wind turbine according to the present disclosure.
Figure 3:
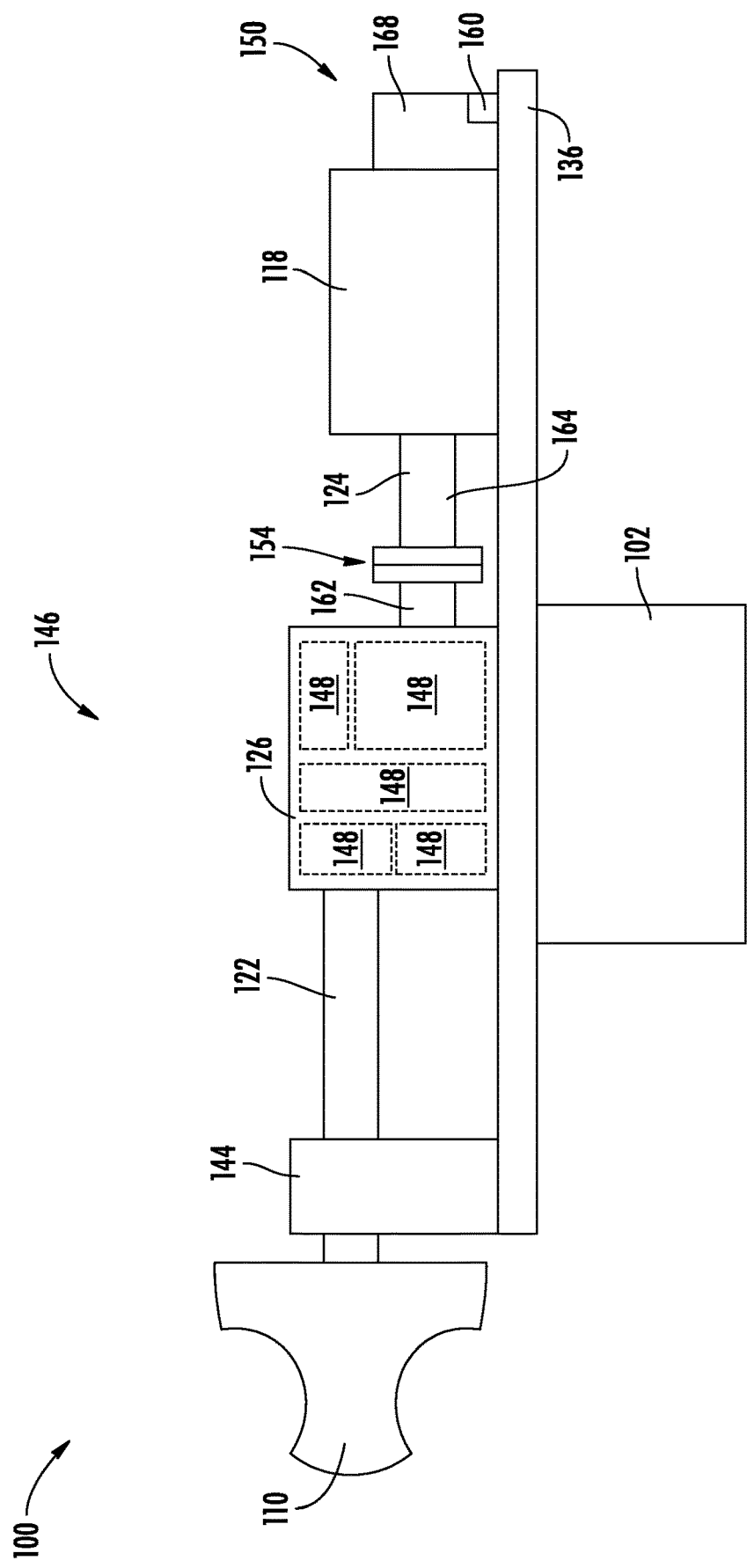
FIG. 3 illustrates a schematic diagram of one embodiment of a drivetrain of the wind turbine according to the present disclosure.
Figure 4:
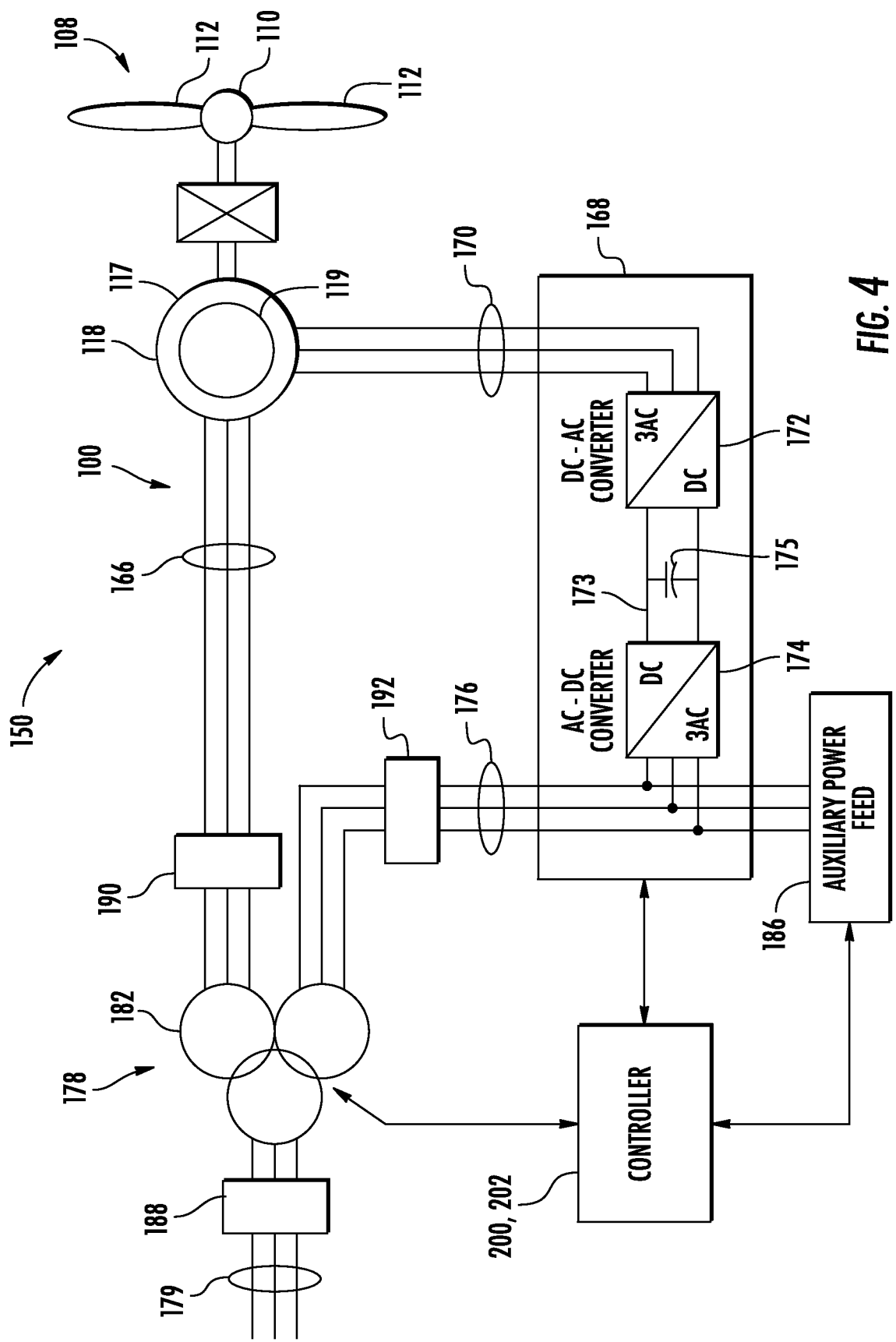
FIG. 4 illustrates a schematic diagram of one embodiment of an electrical system for use with the wind turbine according to the present disclosure.
Figure 5:
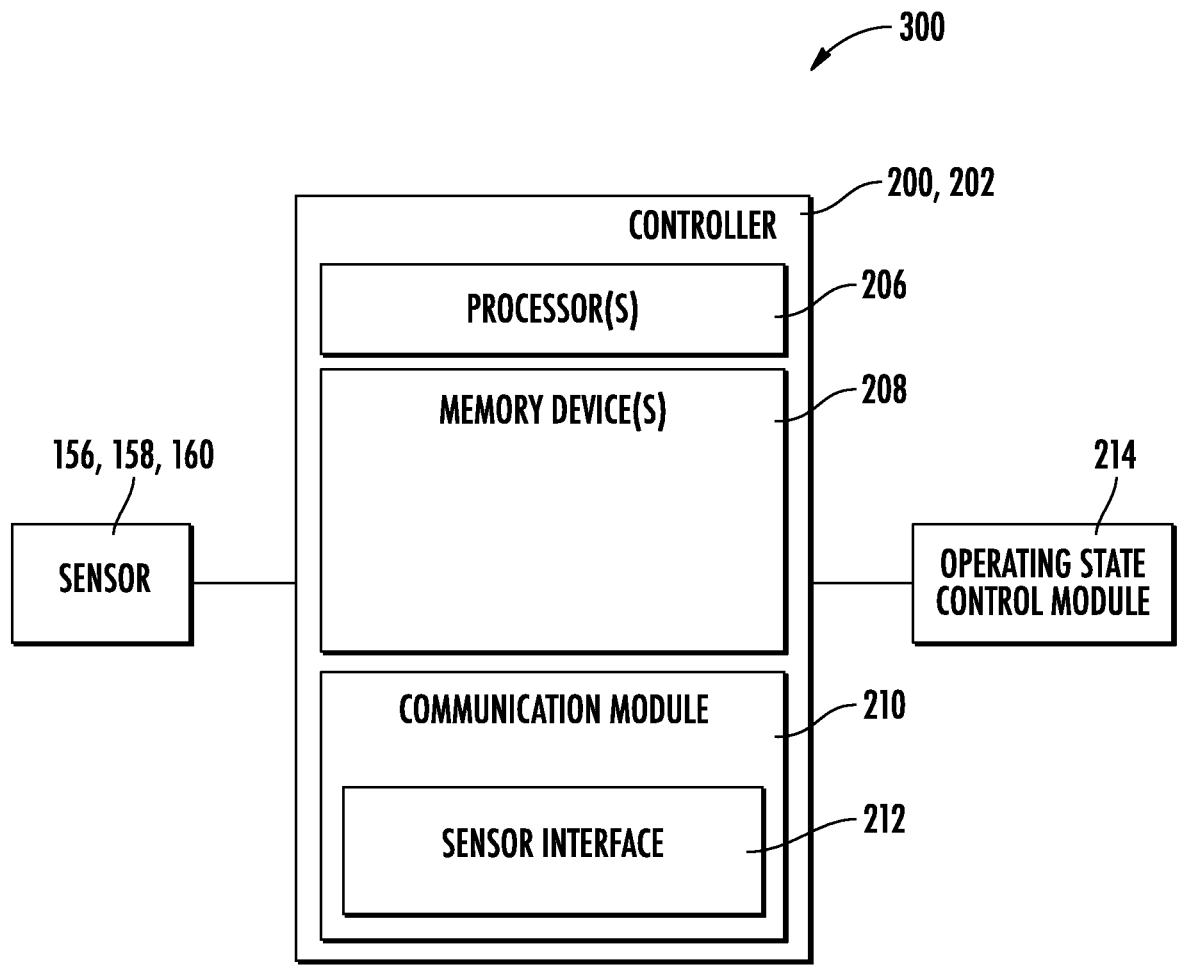
FIG. 5 illustrates a block diagram of one embodiment of a controller for use with the wind turbine according to the present disclosure.

Referring now to FIGS. 2-4, a simplified, internal view of one embodiment of the nacelle 106, a schematic diagram of one embodiment of a drivetrain 146, and an exemplary electrical system 150 of the wind turbine 100 shown in FIG. 1 are illustrated. As shown, the generator 118 may be coupled to the rotor 108 for producing electrical power from the rotational energy generated by the rotor 108. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through an optional gearbox 126 connected to a bedplate support frame 136 by one or more torque arms 142. As is generally understood, the rotor shaft 122 may provide a low-speed, high-torque input to the gearbox 126 in response to rotation of the rotor blades 112 and the hub 110. The gearbox 126 may then be configured with a plurality of gears 148 to convert the low-speed, high-torque input to a high-speed, low-torque output to drive the high-speed shaft 124 and, thus, the generator 118. In an embodiment, the gearbox 126 may be configured with multiple gear ratios so as to produce varying rotational speeds of the high-speed shaft for a given low-speed input, or vice versa.

In an embodiment, the rotor 108 may be slowed via a torque generated by the generator 118. As the generator 118 may generate a torque counter to the rotation of the rotor 108, the high-speed shaft 124 may be equipped with a slip coupling 154. The slip coupling 154 may prevent damage to a component of the drivetrain 146 due to overloading of the drivetrain 146. As such, the slip coupling 154 may have a release threshold, or traction, above which the slip coupling 154 may permit first and second portions 162, 164 of the high-speed shaft 124 to have a different rotational speeds. It should be appreciated that, if the torsional moment at the slip coupling 154 exceeds the release/traction threshold, the generator 118 may be communicatively decoupled from the rotor 108. In such an event, the torque developed by the generator 118 may be unavailable to slow the rotor 108 or an increased rotational speed of the rotor 108 may be unavailable for increased power production.

Each rotor blade 112 may also include a pitch control mechanism 120 configured to rotate the rotor blade 112 about its pitch axis 116. Each pitch control mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116. Similarly, the wind turbine 100 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 100).

Referring particularly to FIG. 2, in an embodiment, the wind turbine 100 may include an environmental sensor 156 configured for gathering data indicative of one or more environmental conditions. The environmental sensor 156 may be operably coupled to the controller 200. Thus, in an embodiment, the environmental sensor(s) 156 may, for example, be a wind vane, an anemometer, a lidar sensor, thermometer, barometer, or any other suitable sensor. The data gathered by the environmental sensor(s) 156 may include measures of wind speed, wind direction, wind shear, wind gust, wind veer, atmospheric pressure, and/or temperature. In at least one embodiment, the environmental sensor(s) 156 may be mounted to the nacelle 106 at a location downwind of the rotor 108. The environmental sensor(s) 156 may, in alternative embodiments, be coupled to, or integrated with, the rotor 108. It should be appreciated that the environmental sensor(s) 156 may include a network of sensors and may be positioned away from the turbine 100.

In addition, the wind turbine 100 may include a at least one operational sensor 158. The operational sensor(s) 158 may be configured to detect a performance of the wind turbine 100, e.g. in response to the environmental condition. For example, the operational sensor(s) 158 may be a rotational speed sensor operably coupled to the controller 200. The operational sensor(s) 158 may be directed at the rotor shaft 122 of the wind turbine 100 and/or the generator 118. The operational sensor(s) 158 may gather data indicative of the rotational speed and/or rotational position of the rotor shaft 122, and thus the rotor 108 in the form of a rotor speed and/or a rotor azimuth. The operational sensor(s) 158 may, in an embodiment, be an analog tachometer, a D.C. tachometer, an A.C. tachometer, a digital tachometer, a contact tachometer a non-contact tachometer, or a time and frequency tachometer. In an embodiment, the operational sensor(s) 158 may, for example, be an encoder, such as an optical encoder.

In an embodiment, the operational sensor(s) 158 and/or environmental sensor(s) 156 may be configured to monitor operating parameters 348 (FIG. 9) of wind turbine 100. For example, the operational sensor(s) 158 and/or environmental sensor(s) 156 may monitor at least one of wind speed, wind direction, or a collective pitch angle of the rotor 108.

Further, in an embodiment, the wind turbine 100 may include an output sensor 160 configured to monitor at least one output parameter 360 (FIG. 10) of the electrical system 150. For example, in monitoring the output parameter(s) 360, the output sensor 160 may monitor the voltage, current, and/or power generated and/or consumed by the wind turbine 100. Accordingly, the operational sensor(s) 158 may, in an embodiment, be an ammeter, a voltmeter, an ohmmeter, and/or any other suitable sensor for monitoring the operating parameter(s) 360 of the electrical system 150 and thereby the wind turbine 100.

It should also be appreciated that, as used herein, the term "monitor" and variations thereof indicates that the various sensors of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the wind turbine 100.

Referring particularly to FIG. 4, in an embodiment, the electrical system 150 may include various components for converting the kinetic energy of the rotor 108 into an electrical output in an acceptable form to a connected power grid. For example, in an embodiment, the generator 118 may be a doubly-fed induction generator (DFIG) having a stator 117 and a generator rotor 119. The generator 118 may be coupled to a stator bus 166 and a power converter 168 via a rotor bus 170. In such a configuration, the stator bus 166 may provide an output multiphase power (e.g. three-phase power) from a stator of the generator 118, and the rotor bus 170 may provide an output multiphase power (e.g. three-phase power) of the generator rotor 119 of the generator 118. Additionally, the generator 118 may be coupled via the rotor bus 170 to a rotor side converter 172. The rotor side converter 172 may be coupled to a line side converter 174 which, in turn, may be coupled to a line side bus 176.

In an embodiment, the rotor side converter 172 and the line side converter 174 may be configured for normal operating mode in a three-phase, pulse width modulation (PWM) arrangement using insulated gate bipolar transistors (IGBTs) as switching devices. Other suitable switching devices may be used, such as insulated gate commuted thyristors, MOSFETs, bipolar transistors, silicone controlled rectifier's, and/or other suitable switching devices. The rotor side converter 172 and the line side converter 174 may be coupled via a DC link 173 across which may be a DC link capacitor 175.

In an embodiment, the power converter 168 may be coupled to the controller 200 configured as a converter controller 202 to control the operation of the power converter 168. For example, the converter controller 202 may send control commands to the rotor side converter 172 and the line side converter 174 to control the modulation of switching elements used in the power converter 168 to establish a desired generator torque setpoint and/or power output.

As further depicted in FIG. 4, the electrical system 150 may, in an embodiment, include a transformer 178 coupling the wind turbine 100 to an electrical grid 179. The transformer 178 may, in an embodiment, be a 3-winding transformer which includes a high voltage (e.g. greater than 12 KVAC) primary winding 180. The high voltage primary winding 180 may be coupled to the electrical grid 179. The transformer 178 may also include a medium voltage (e.g. 6 KVAC) secondary winding 182 coupled to the stator bus 166 and a low voltage (e.g. 575 VAC, 690 VAC, etc.) auxiliary winding 184 coupled to the line bus 176. It should be appreciated that the transformer 178 can be a three-winding transformer as depicted, or alternatively, may be a two-winding transformer having only a primary winding 180 and a secondary winding 182; may be a four-winding transformer having a primary winding 180, a secondary winding 182, and auxiliary winding 184, and an additional auxiliary winding; or may have any other suitable number of windings.

In an additional embodiment, the electrical system 150 may include an auxiliary power feed 186 coupled to the output of the power converter 168. The auxiliary power feed 186 may act as a power source for various components of the wind turbine system 100. For example, the auxiliary power feed 186 may power fans, pumps, motors, and other suitable components of the wind turbine system 100.

In an embodiment, the electrical system 150 may also include various circuit breakers, fuses, contactors, and other devices to control and/or protect the various components of the electrical system 150. For example, the electrical system 150 may, in an embodiment, include a grid circuit breaker 188, a stator bus circuit breaker 190, and/or a line bus circuit breaker 192. The circuit breaker(s) 188, 190, 192 of the electrical system 150 may connect or disconnect corresponding components of the electrical system 150 when a condition of the electrical system 150 approaches an operational threshold of the electrical system 150.

Referring now to FIGS. 5-10, multiple embodiments of a system 300 for controlling the wind turbine 100 according to the present disclosure are presented. As shown particularly in FIG. 5, a schematic diagram of one embodiment of suitable components that may be included within the system 300 is illustrated. For example, as shown, the system 300 may include the controller 200 communicatively coupled to the operational sensor(s) 158, the output sensor(s) 160, and/or environmental sensor(s) 156. Further, as shown, the controller 200 includes one or more processor(s) 206 and associated memory device(s) 208 configured to perform a variety of computer-implemented functions (e.g., performing the methods, steps, calculations and the like and storing relevant data as disclosed herein). Additionally, the controller 200, may also include a communications module 210 to facilitate communications between the controller 200, and the various components of the wind turbine 100. Further, the communications module 210 may include a sensor interface 212 (e.g., one or more analog-to-digital converters) to permit signals transmitted from the sensor(s) 156, 158 to be converted into signals that can be understood and processed by the processors 206. It should be appreciated that the sensor(s) 156, 158, 160 may be communicatively coupled to the communications module 210 using any suitable means. For example, the sensor(s) 156, 158, 160 may be coupled to the sensor interface 212 via a wired connection. However, in other embodiments, the sensor(s) 156, 158, 160 may be coupled to the sensor interface 212 via a wireless connection, such as by using any suitable wireless communications protocol known in the art. Additionally, the communications module 210 may also be operably coupled to an operating state control module 214 configured to change at least one wind turbine operating state.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, detecting an anonymous operational event and initiating an enhanced braking mode for the wind turbine 100 as described herein, as well as various other suitable computer-implemented functions.

Figure 6:
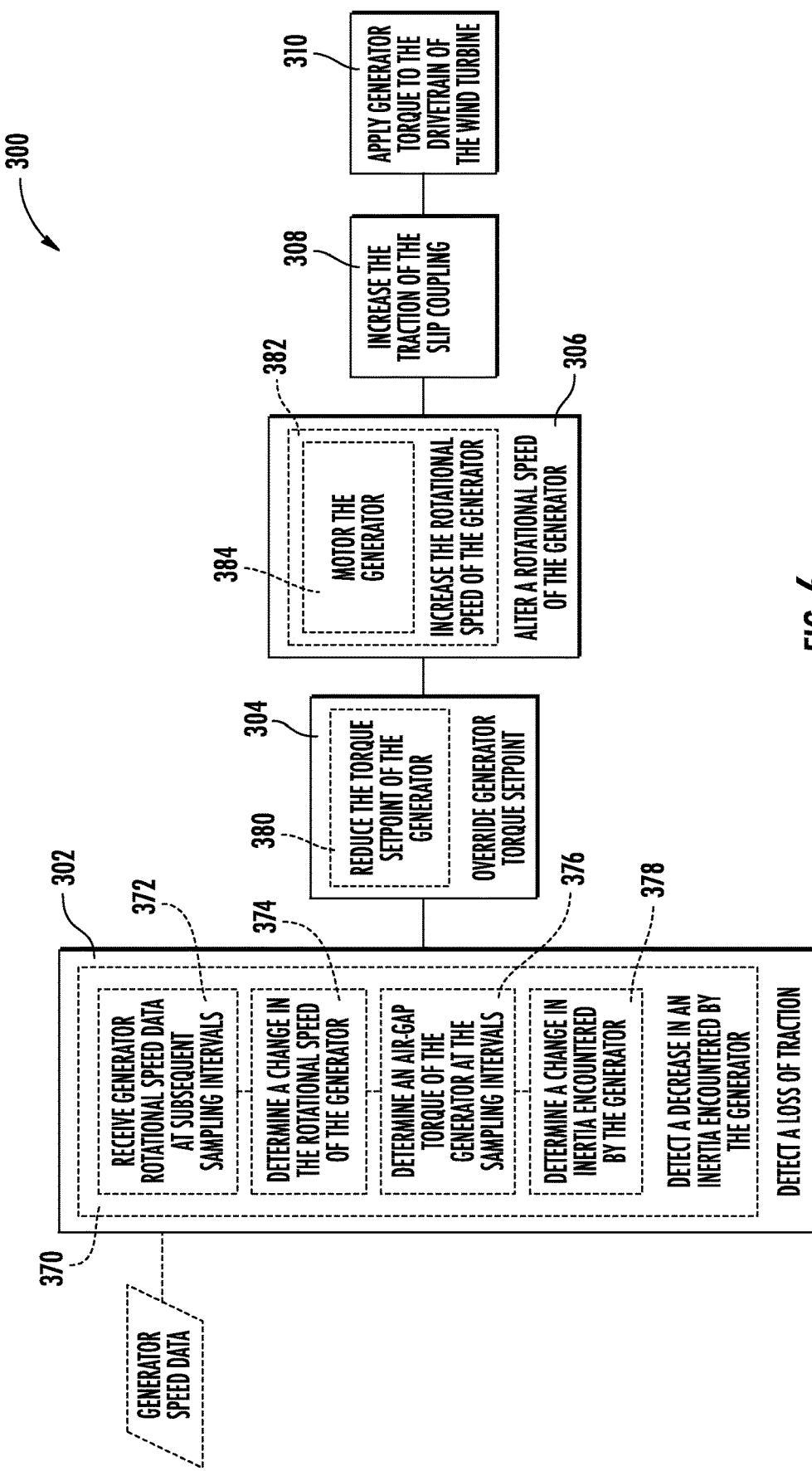
FIG. 6 illustrates a flow diagram of one embodiment of a control logic of a system for controlling a wind turbine according to the present disclosure.

Referring particularly to FIG. 6 as shown at 302, the controller 200 may be configured to detect a loss of traction of the slip coupling 154. In response to detecting the loss of traction of the slip coupling 154, the controller 200 may, at 304, override a generator torque setpoint of the generator 118. As depicted at 306, overriding the generator torque setpoint may alter a rotational speed of the generator 118. Altering the rotational speed of the generator 118 may, at 308, increase the traction of the slip coupling 154. It should be appreciated that increasing the traction of the slip coupling 154 may facilitate, at 310, the application of generator torque to the drivetrain 146 of the wind turbine 100. It should further be appreciated that altering the generator torque set point may include a change to a rotor voltage, an angle between a rotor and a stator feed voltage vector and/or slip so to affect the torque of the generator.

For example, in an embodiment, the controller 200 may be configured to monitor a torque level of the slip coupling 154. It should be appreciated that in an embodiment wherein the torque level of the slip coupling 154 exceeds the nominal release threshold of the slip coupling 154, the slip coupling 154 may operably decouple the generator 118 from the rotor shaft 122. In such an embodiment, the torque developed by the generator 118 may then be unavailable to assist with the slowing of the rotor 108 or the rotational speed of the rotor 108 may be unavailable for power generation. Accordingly, the system 300 may alter the rotational speed of the generator 118 as the torque level of the slip coupling 154 approaches/exceeds the release threshold so as to maintain or reestablish the operable coupling between the generator 118 and the rotor 108.

In an embodiment, the controller 200 may be configured as the converter controller 202. The converter controller 202 may have higher fidelity performance data related to the electrical system 150 and may be available to other controllers, such as a turbine controller or a farm controller. For example, in an embodiment, the converter controller 202 may have a sampling frequency which is at least an order of magnitude greater than the sampling frequency of a controller 200 configured as a turbine controller. For example, in an embodiment, the converter controller 202 may have a sampling frequency of at least one sample every 200 microseconds. In other words, the converter controller 202 may receive data related to the electrical system 150 at least once every 200 microseconds. The converter controller 202 may also generate command signals to alter a state of a component of the electrical system 150 at the same frequency of at least once every 200 microseconds. Accordingly, the converter controller 202 may have a greater capacity to detect and react to the slipping of the slip coupling 154 based on data related to the electrical system 150 (e.g. the rotational speed of the generator, air-gap torque, etc.) than other controllers 200. It should be appreciated that the slipping of the slip coupling 154 due to a loss of traction may result in the operational decoupling of the generator 118 from the rest of the drivetrain 146 of the wind turbine 100. As the generator torque may be particularly critical to the slowing of the rotor 108 during an anomalous operational event, such as an overspeed condition, the rapid detection of the loss of traction of the slip coupling 154 may be desirable.

Figure 7:
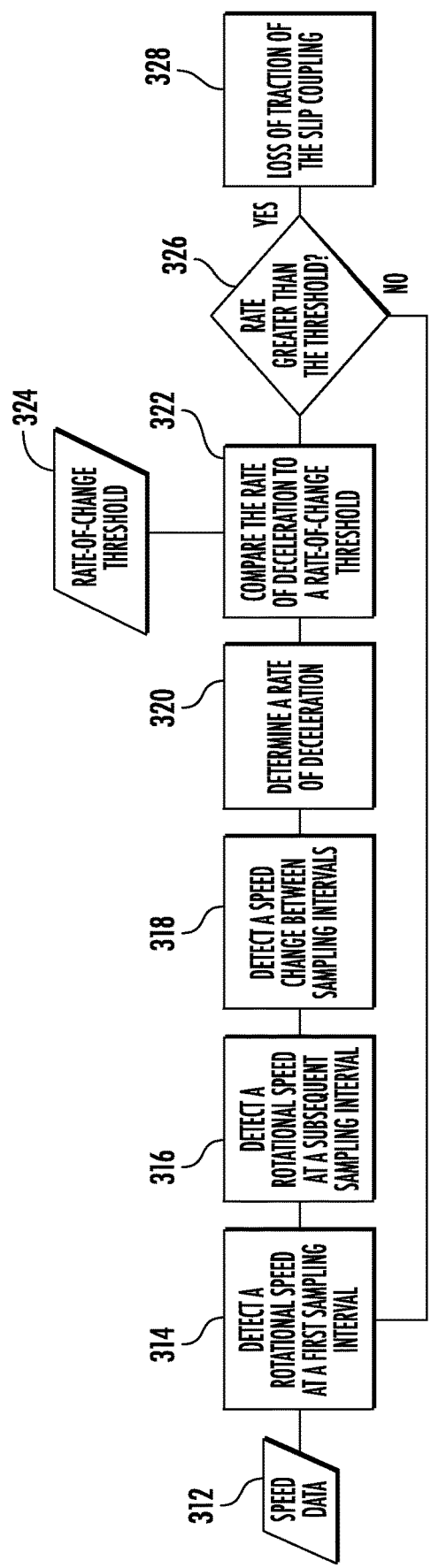
FIG. 7 illustrates a flow diagram of one embodiment of a portion of the control logic of FIG. 6 corresponding to the detection of a loss of traction of the slip coupling according to the present disclosure.

Referring now to FIG. 7, a flow diagram of one embodiment of a portion of the control logic of the system 300 corresponding to the detection of a loss of traction at 302 is depicted. In an embodiment, as shown, the controller 200 may receive speed data 312 indicative of at least one rotational speed from an encoder operably coupled to the high-speed shaft 124 of the drivetrain 146 and/or the generator rotor 119.

In an embodiment, the speed data 312 may be indicative of a rotational speed of the generator 118. Accordingly, in an embodiment, the controller 200 may, at 314, be configured to detect the rotational speed at a first sampling interval. Further, the controller 200 may, at 316, be configured to detect the rotational speed at a subsequent, second sampling interval. In an embodiment as shown at 318, the controller 200 of the system 300 may be configured to detect a speed change of the generator 118 between the sampling intervals. In an embodiment, the speed change may be a deceleration. The deceleration may be a deceleration of the generator rotor 119 and may be indicative of a loss of traction of the slip coupling 154

In an embodiment, the sampling intervals may be sequential, but in a further embodiment, the sampling intervals may be separated by some number of intervening sampling intervals. It should, however, be appreciated that decreasing an elapsed time between the sampling intervals (e.g. increasing the frequency of the sampling intervals) may increase the responsiveness of the system 300 to the initiation of a loss of traction of the slip coupling 154.

Referring still to FIG. 7, as depicted at 320, the controller 200 may determine a rate of deceleration of the generator 118 based on the rotational speeds detected at the sampling intervals at 314 and 316. In an embodiment, the controller may, at 322, compare the rate of deceleration to a rate of change threshold 324. Accordingly, the controller 200 may, at 326 determine that the rate of deceleration is greater than the threshold therefore indicating, at 328, a loss of traction of the slip coupling 154. In other words, the controller 200 (e.g. converter controller 202) may determine that the generator 118 is decelerating at a greater rate than would be possible if the generator 118 remained operably coupled to the rotor 108.

It should be appreciated that the inertia of the rotating mass of the rotor 108 may require a significant amount of counter torque in order to decelerate. Accordingly, the controller 200 may be configured to compute the maximum deceleration of the rotor 108 which may be achieved given the available torque which may be developed by the generator 118. However, should the slip coupling begin to slip, the inertia of the rotor 108 may not be experienced by the generator 118, and therefore, the generator 118 may decelerate against no opposing force, and, thus, at an increased rate than would be achievable when operably coupled to the rotor 108.

Figure 8:
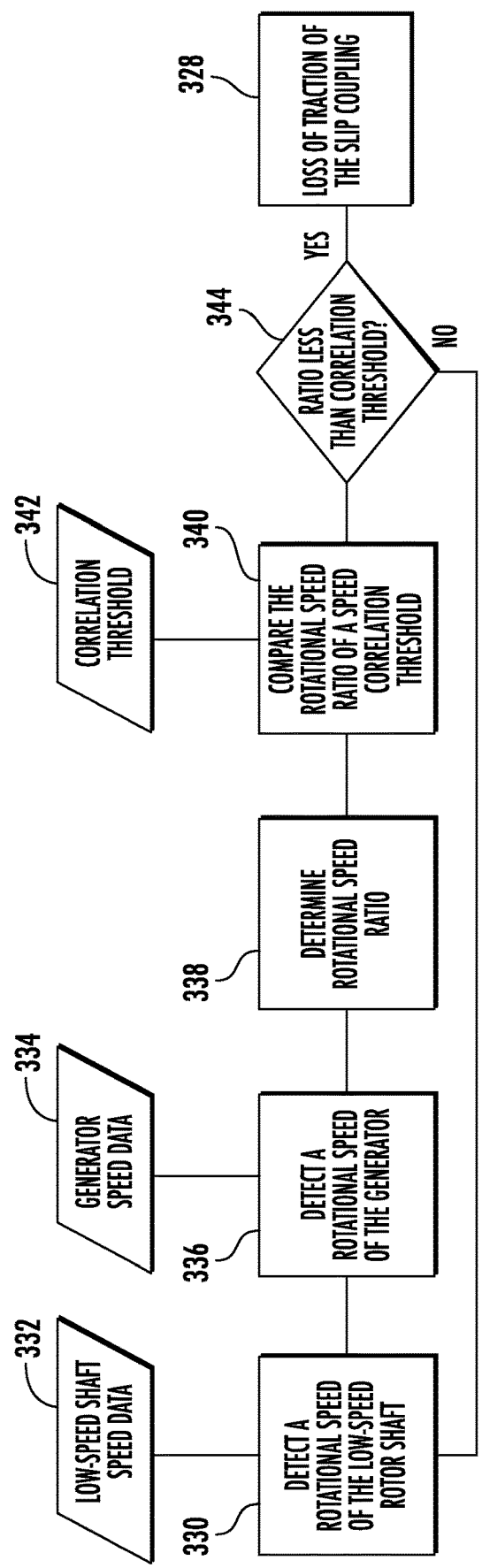
FIG. 8 illustrates a flow diagram of one embodiment of a portion of the control logic of FIG. 6 corresponding to the detection of a loss of traction of the slip coupling according to the present disclosure.

Referring now to FIG. 8, a flow diagram of one embodiment of a portion of the control logic of the system 300 corresponding to the detection of a loss of traction at 302 is depicted. In an embodiment, the controller 200 may, at 330, detect a rotational speed of the low-speed rotor shaft 122 based on the received low-speed shaft data 332. As shown at 336, the controller 200 may also receive generator speed data 334 in order to detect a rotational speed of the generator 118. Additionally, in an embodiment, the controller 200 may, at 338, determine a rotational-speed ratio correlating the rotational speed of the generator 118 with the rotational speed of the low-speed rotor shaft 122. As depicted at 340, the controller 200 may compare the rotational speed ratio to a speed correlation threshold 342. Accordingly, the controller 200 may, at 344, determine that the ratio of the rotational speed of the generator 118 to the rotational speed of the low-speed rotor shaft 122 is less than the correlation threshold, therefore indicating, at 328, a loss of traction of the slip coupling 154. In other words, when the generator 118 is operably coupled to the low-speed rotor shaft 122 via the slip coupling 154, the rotational speed of the generator 118 may be determined by the rotational speed of the low-speed rotor shaft 122 as modified by the gearbox 126. However, when traction is lost in the slip coupling 154, the rotational speed of the generator 118 may be uncorrelated to the rotational speed of the low-speed rotor shaft 122 so that the rotational speed of one has no bearing on the rotational speed of the other.

Figure 9:
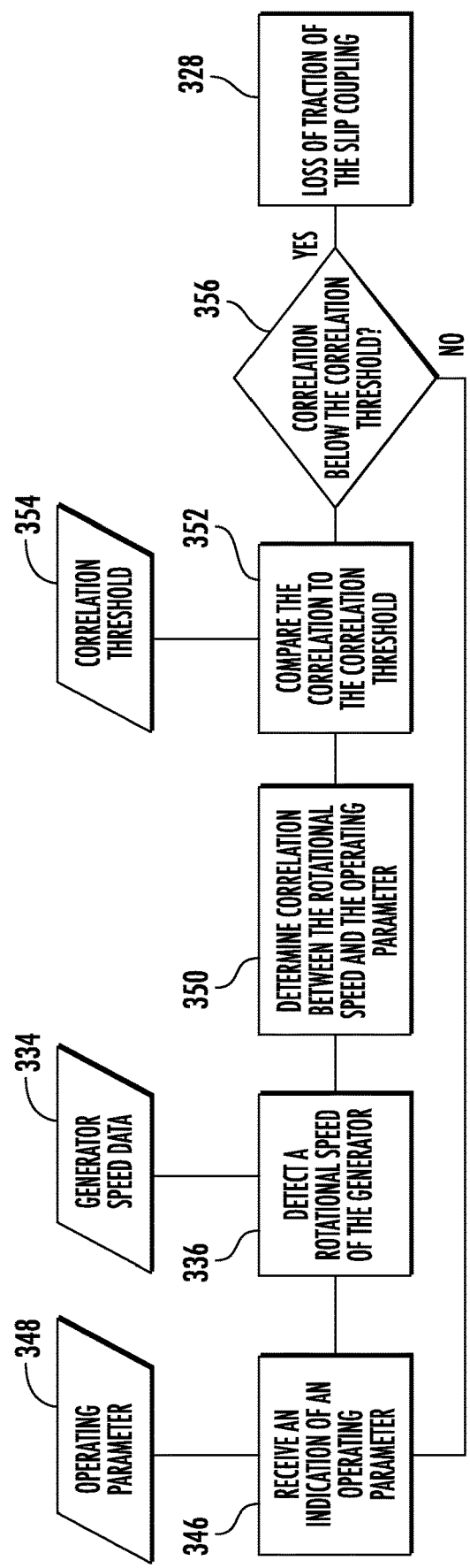
FIG. 9 illustrates a flow diagram of one embodiment of a portion of the control logic of FIG. 6 corresponding to the detection of a loss of traction of the slip coupling according to the present disclosure.

Referring now to FIG. 9, a flow diagram of one embodiment of a portion of the control logic of the system 300 corresponding to the detection of a loss of traction at 302 is depicted. In an embodiment, the controller 200 may, at 346, receive an indication of at least one operating parameter 348. The operating parameter(s) 348 may include indications of wind speed, wind direction, and/or a collective pitch angle of the rotor 108. The controller 200 may also receive generator speed data 334 in order to detect the rotational speed of the generator 118 at 336. Additionally, in an embodiment, the controller 200 may, at 350, determine a correlation between the rotational speed of the generator 118 and the operating parameter 348. As depicted at 352, the controller 200 may compare the determined correlation to a correlation threshold 354. Accordingly, the controller 200 may, at 356, determine that the correlation is less than the correlation threshold, therefore indicating, at 328, a loss of traction of the slip coupling 154. In other words, in an embodiment, when the generator 118 is operably coupled to the rotor 108 and the wind turbine is operating under the indicated operating parameter(s) 348, a certain rotational speed of the generator 118 may be anticipated which correlates to the operating parameter(s) 348. However, when slippage is present in the slip coupling 154, the rotational speed of the generator 118 may not be the rotational speed anticipated for the detected operating parameter(s) 348, and may, therefore, be uncorrelated to the operating parameter(s) 348.

Figure 10:
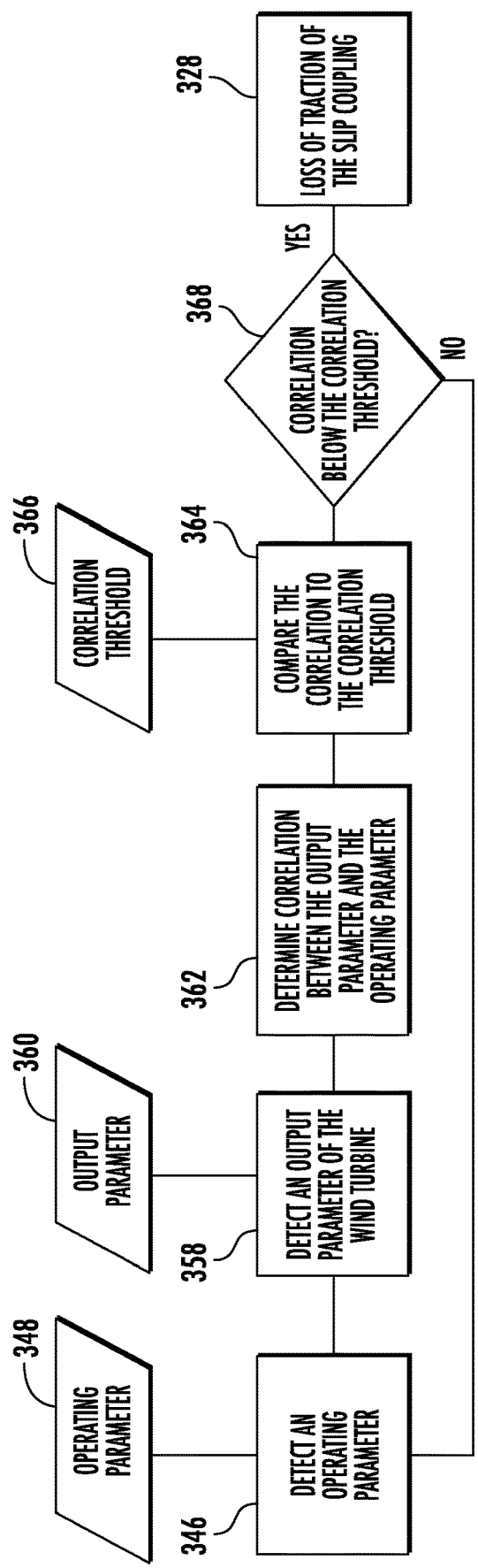
FIG. 10 illustrates a flow diagram of one embodiment of a portion of the control logic of FIG. 6 corresponding to the detection of a loss of traction of the slip coupling according to the present disclosure.

Referring now to FIG. 10, a flow diagram of one embodiment of a portion of the control logic of the system 300 corresponding to the detection of a loss of traction at 302 is depicted. In an embodiment, the controller 200 may, at 346, receive an indication of the operating parameter(s) 348. The controller 200 may also, at 358, be configured to detect an output parameter 360 of the wind turbine 100. The output parameter 360 may include indications of voltage, current, and/or power output of the electrical system 150 of the wind turbine 100. As depicted at 362, the controller 200 may determine a correlation between the output parameter 360 and the operating parameter (s) 348. As depicted at 364, the controller 200 may compare the determined correlation to a correlation threshold 366. Accordingly, the controller 200 may, at 368, determine that the correlation is less than the correlation threshold, therefore indicating, at 328, a loss of traction of the slip coupling 154. In other words, in an embodiment, when the generator 118 is operably coupled to the rotor 108 and the wind turbine is operating under the indicated operating parameter(s) 348, a certain output may be anticipated from the wind turbine 100. For example, under normal operating conditions, for a given wind speed and direction (e.g., operating parameter(s) 348, a wind turbine 100 may be expected to develop a certain power output (e.g., output parameter 360) for delivery to the power grid. However, in an embodiment wherein the generator 118 is operably decoupled from the drivetrain 146 by a loss of traction of the slip coupling 154, the output of voltage, current and/or power from the wind turbine 100 may significantly decrease.

Referring again to FIG. 6, in an embodiment, the detection of the loss of traction at 300 into may include detecting, at 370, a decrease in an inertia encountered by the generator 118. The inertia encountered by the generator 118 may include at least an inertia of the rotor 108. However, in an embodiment, the inertia encountered, or seen, by the generator 118 may also include the inertia of the low-speed rotor shaft 122 and an engaged portion of the plurality of gears 148. The inertia encountered by the generator 118 may be the rotational force resisted by the generator 118 in an embodiment wherein generator braking torque is applied to the drivetrain 146, such as in response to an anomalous operational event.

As depicted at 372, in an embodiment, the controller 200 may be configured to detect the decrease in the inertia encountered/resisted by the generator 118 by receiving an indication of the rotational speed of the generator 118 at the first sampling interval and a subsequent, second sampling interval. Based on the rotational speed indications, the controller may, at 374, determine a change in the rotational speed of the generator 118. In particular, the indications may, in an embodiment, correspond to a deceleration of the generator 118 resulting from the braking torque of the generator 118 being unopposed by the inertia of the rotor 108 during a braking operation. In addition to the rotational speed indications, the controller 200 may, at 376, be configured to determine an air-gap torque of the generator 118 at the sampling intervals. As further depicted at 378, the controller 200 may utilize at least the change in the rotational speed and the air-gap torque at the sampling intervals to determine a change in the inertia encountered by the generator 118. It should be appreciated that utilizing the rotational speed of the generator 118 and the computed air-gap torque of the generator 118 may be accomplished utilizing only components of the electrical system 150 and without requiring additional sensors and/or communications protocols, such as a low-speed rotor shaft 122 speed data 332. Accordingly, the converter controller 202 may, in an embodiment, rapidly detect a decrease in the inertia encountered by the generator 118, thereby facilitating a rapid response to the loss of traction of the slip coupling 154.

Referring still to FIG. 6, in an embodiment, overriding the generator torque setpoint may, as depicted at 380, include reducing the torque set point of the generator 118. Reducing the torque set point of the generator may facilitate an increase in the rotational speed of the generator 118 by reducing a resistance to the rotation of the generator rotor 119. Accordingly, as depicted at 382, the system 300 may be configured to alter the rotational speed of the generator by increasing the rotational speed. In at least one embodiment, increasing the rotational speed of the generator 118 may include, as depicted at 384, motoring the generator so as to accelerate the generator rotor 119. It should be appreciated that increasing the rotational speed of the generator may facilitate increasing the traction of the slip coupling 154 by bringing a difference between the rotational speeds of the first and second portions 162, 164 of the high-speed shaft 124 to within an acceptable degree of synchronicity.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for controlling a wind turbine, the wind turbine having a drivetrain comprising a rotor rotatably coupled to a generator via a slip coupling, the method comprising: detecting, with a controller, a loss of traction of the slip coupling; in response to the detecting the loss of traction, overriding, with the controller, a generator torque setpoint to alter a rotational speed of the generator; and increasing the traction of the slip coupling in response to the altered rotational speed of the generator, wherein increasing the traction of the slip coupling facilitates an application of generator torque to the drivetrain of the wind turbine.

Clause 2. The method of clause 1, further comprising: receiving, with the controller, an indication of at least one rotational speed from an encoder operably coupled to at least one of a high-speed shaft of the drivetrain or a generator rotor.

Clause 3. The method of any preceding clause, wherein the controller is a converter controller, and wherein the converter controller has a sampling frequency of at least one sample every 200 microseconds.

Clause 4. The method of any preceding clause, wherein the at least one rotational speed is a rotational speed of the generator, and wherein detecting the loss of traction of the slip coupling further comprises: detecting, with the controller, the rotational speed at a first sampling interval; detecting, with the controller, the rotational speed at a subsequent sampling interval; and detecting, with the controller, a speed change of the generator between the sampling intervals, wherein the speed change comprises a deceleration.

Clause 5. The method of any preceding clause, wherein detecting the speed change of the generator further comprises: determining, with the controller, a rate of deceleration of the generator based on the rotational speeds detected at the sampling intervals, wherein the rate of deceleration is greater than a rate of change threshold for the wind turbine.

Clause 6. The method of any preceding clause, wherein the drivetrain further comprises a low-speed shaft coupling the rotor to a gearbox, the gearbox being coupled to the generator via the slip coupling, the method further comprising: detecting, with the controller, a rotational speed of the low-speed rotor shaft; detecting, with the controller, a rotational speed of the generator; determining, with the controller, a ratio of the rotational speed of the generator to the rotational speed of the low-speed rotor shaft which is less than a speed correlation threshold.

Clause 7. The method of any preceding clause, wherein the at least one rotational speed is a rotational speed of the generator, the method further comprising: receiving, with the controller, an indication of at least one operating parameter of the wind turbine, the at least one operating parameter comprising at least one of wind speed, wind direction, or a collective pitch angle of the rotor; and determining, with the controller, a correlation between the at least one operating parameter and the rotational speed of the generator which is below a corresponding correlation threshold.

Clause 8. The method of any preceding clause, wherein detecting the loss of traction of the slip coupling further comprises: detecting, with the controller, a decrease in an inertia encountered by the generator, wherein the inertia encountered by the generator includes at least a rotor inertia.

Clause 9. The method of any preceding clause, wherein detecting the decrease in the inertia encountered by the generator comprises: receiving, with the controller, an indication of the rotational speed of the generator at a first sampling interval and a subsequent sampling interval, the indications being indicative of a change in the rotational speed; determining, with the controller, an air-gap torque of the generator at the sampling intervals; and determining, with the controller, a change in an inertia encountered by the generator based, at least in part, on the change in the rotational speed and the air-gap torque at the sampling intervals.

Clause 10. The method of any preceding clause, wherein detecting the loss of traction of the slip coupling further comprises: detecting, with the controller, at least one operating parameter of the wind turbine, the at least one operating parameter comprising at least one of wind speed, wind direction, or a collective pitch angle of the rotor; detecting, with the controller, an output parameter of the wind turbine, the output parameter comprising at least one of voltage, current, or power; and determining, with the controller, a correlation between the output parameter and the at least one operating parameter which is below a correlation threshold.

Clause 11. The method of any preceding clause, wherein overriding the generator torque setpoint to alter the rotational speed of the generator further comprises: reducing the torque setpoint of the generator so as to facilitate an increase in the rotational speed of the generator, wherein increasing the rotational speed of the generator facilitates increasing the traction of the slip coupling.

Clause 12. The method of any preceding clause, wherein increasing the traction of the slip coupling further comprises: increasing the rotational speed of the generator by motoring the generator.

Clause 13. A system for controlling a wind turbine, the system comprising: a generator rotatably coupled to a rotor via a slip coupling; and a controller communicatively coupled to the generator, the controller comprising at least one processor configured to perform a plurality of operations, the plurality of operations comprising: detecting a loss of traction of the slip coupling, in response to the detecting the loss of traction, overriding a generator torque setpoint to alter a rotational speed of the generator, and increasing the traction of the slip coupling in response to the altered rotational speed of the generator, wherein increasing the traction of the slip coupling facilitates an application of generator torque to the drivetrain of the wind turbine.

Clause 14. The system of any preceding clause, wherein the plurality of operations further comprise: receiving an indication of at least one rotational speed from an encoder operably coupled to at least one of a high-speed shaft or a generator rotor.

Clause 15. The system of any preceding clause, wherein the controller is a converter controller, and wherein the converter controller has a sampling frequency of at least one sample every 200 milliseconds.

Clause 16. The system of any preceding clause, wherein detecting the loss of traction of the slip coupling further comprises: detecting the rotational speed at a first sampling interval; detecting the rotational speed at a subsequent sampling interval; and detecting a speed change of the generator between the sampling intervals, wherein the speed change comprises a deceleration.

Clause 17. The system of any preceding clause, wherein detecting the speed change of the generator further comprises: determining, with the controller, a rate of deceleration of the generator based on the rotational speeds detected at the sampling intervals, wherein the rate of deceleration is greater than a rate of change threshold for the wind turbine.

Clause 18. The system of any preceding clause, wherein detecting the loss of traction of the slip coupling further comprises: detecting a decrease in an inertia encountered by the generator, wherein the inertia encountered the generator includes at least a rotor inertia, wherein detecting the decrease in the inertia comprises: receiving an indication of the rotational speed of the generator at a first sampling interval and a subsequent sampling interval, the indications being indicative of a change in the rotational speed, determining an air-gap torque of the generator at the sampling intervals, and determining a change in an inertia encountered by the generator based, at least in part, on the change in the rotational speed and the air-gap torque at the sampling intervals.

Clause 19. The system of any preceding clause, wherein overriding the generator torque setpoint altered the rotational speed of the generator further comprises: reducing the torque setpoint of the generator so as to facilitate an increase in the rotational speed of the generator, wherein increasing the rotational speed of the generator facilitates increasing the traction of the slip coupling.

Clause 20. System of any preceding clause, wherein increasing the traction of the slip coupling further comprises: increasing the rotational speed of the generator by motoring the generator.

What is claimed is:

1. A method for controlling a wind turbine, the wind turbine having a drivetrain comprising a rotor rotatably coupled to a generator via a slip coupling, the method comprising:
    detecting, with a controller, a loss of traction of the slip coupling;
    in response to detecting the loss of traction, overriding, with the controller, a generator torque setpoint to alter a rotational speed of the generator; and
    increasing the traction of the slip coupling in response to the altered rotational speed of the generator, wherein increasing the traction of the slip coupling facilitates an application of generator torque to the drivetrain of the wind turbine.

2. The method of claim 1, further comprising:
    receiving, with the controller, an indication of at least one rotational speed from an encoder operably coupled to at least one of a high-speed shaft of the drivetrain or a generator rotor.

3. The method of claim 2, wherein the controller is a converter controller, and wherein the converter controller has a sampling frequency of at least one sample every 200 microseconds.

4. The method of claim 2, wherein the at least one rotational speed is a rotational speed of the generator, and wherein detecting the loss of traction of the slip coupling further comprises:
    detecting, with the controller, the rotational speed at a first sampling interval;
    detecting, with the controller, the rotational speed at a subsequent, second sampling interval; and
    detecting, with the controller, a speed change of the generator between the first and second sampling intervals, wherein the speed change comprises a deceleration.

5. The method of claim 4, wherein detecting the speed change of the generator further comprises:
    determining, with the controller, a rate of deceleration of the generator based on the rotational speeds detected at the sampling intervals, wherein the rate of deceleration is greater than a rate of change threshold for the wind turbine.

6. The method of claim 2, wherein the drivetrain further comprises a low-speed shaft coupling the rotor to a gearbox, the gearbox being coupled to the generator via the slip coupling, the method further comprising:
    detecting, with the controller, a rotational speed of the low-speed rotor shaft;
    detecting, with the controller, a rotational speed of the generator;
    determining, with the controller, a ratio of the rotational speed of the generator to the rotational speed of the low-speed rotor shaft which is less than a speed correlation threshold.

7. The method of claim 2, wherein the at least one rotational speed is a rotational speed of the generator, the method further comprising:
    receiving, with the controller, an indication of at least one operating parameter of the wind turbine, the at least one operating parameter comprising at least one of wind speed, wind direction, or a collective pitch angle of the rotor; and
    determining, with the controller, a correlation between the at least one operating parameter and the rotational speed of the generator which is below a corresponding correlation threshold.

8. The method of claim 1, wherein detecting the loss of traction of the slip coupling further comprises:
    detecting, with the controller, a decrease in an inertia encountered by the generator, wherein the inertia encountered by the generator includes at least a rotor inertia.

9. The method of claim 8, wherein detecting the decrease in the inertia encountered by the generator comprises:
    receiving, with the controller, an indication of the rotational speed of the generator at a first sampling interval and a subsequent, second sampling interval, the indications being indicative of a change in the rotational speed;
    determining, with the controller, an air-gap torque of the generator at the first and second sampling intervals; and
    determining, with the controller, a change in an inertia encountered by the generator based, at least in part, on the change in the rotational speed and the air-gap torque at the first and second sampling intervals.

10. The method of claim 1, wherein detecting the loss of traction of the slip coupling further comprises:
    detecting, with the controller, at least one operating parameter of the wind turbine, the at least one operating parameter comprising at least one of wind speed, wind direction, or a collective pitch angle of the rotor;
    detecting, with the controller, an output parameter of the wind turbine, the output parameter comprising at least one of voltage, current, or power; and
    determining, with the controller, a correlation between the output parameter and the at least one operating parameter which is below a correlation threshold.

11. The method of claim 1, wherein overriding the generator torque setpoint to alter the rotational speed of the generator further comprises:
    reducing the torque setpoint of the generator so as to facilitate an increase in the rotational speed of the generator, wherein increasing the rotational speed of the generator facilitates increasing the traction of the slip coupling.

12. The method of claim 1, wherein increasing the traction of the slip coupling further comprises:
    increasing the rotational speed of the generator by motoring the generator.

13. A system for controlling a wind turbine, the system comprising:
    a generator rotatably coupled to a rotor via a slip coupling; and
    a controller communicatively coupled to the generator, the controller comprising at least one processor configured to perform a plurality of operations, the plurality of operations comprising:
        detecting a loss of traction of the slip coupling,
        in response to the detecting the loss of traction, overriding a generator torque setpoint to alter a rotational speed of the generator, and
        increasing the traction of the slip coupling in response to the altered rotational speed of the generator, wherein increasing the traction of the slip coupling facilitates an application of generator torque to a drivetrain of the wind turbine.

14. The system of claim 13, wherein the plurality of operations further comprise:
    receiving an indication of at least one rotational speed from an encoder operably coupled to at least one of a high-speed shaft or a generator rotor.

15. The system of claim 14, wherein the controller is a converter controller, and wherein the converter controller has a sampling frequency of at least one sample every 200 milliseconds.

16. The system of claim 14, wherein detecting the loss of traction of the slip coupling further comprises:
    detecting the rotational speed at a first sampling interval;
    detecting the rotational speed at a subsequent sampling interval; and
    detecting a speed change of the generator between the sampling intervals, wherein the speed change comprises a deceleration.

17. The system of claim 15, wherein detecting the speed change of the generator further comprises:
    determining, with the controller, a rate of deceleration of the generator based on the rotational speeds detected at the sampling intervals, wherein the rate of deceleration is greater than a rate of change threshold for the wind turbine.

18. The system of claim 15, wherein detecting the loss of traction of the slip coupling further comprises:
    detecting a decrease in an inertia encountered by the generator, wherein the inertia encountered the generator includes at least a rotor inertia, wherein detecting the decrease in the inertia comprises:
        receiving an indication of the rotational speed of the generator at a first sampling interval and a subsequent sampling interval, the indications being indicative of a change in the rotational speed,
        determining an air-gap torque of the generator at the sampling intervals, and
        determining a change in an inertia encountered by the generator based, at least in part, on the change in the rotational speed and the air-gap torque at the sampling intervals.

19. The system of claim 13, wherein overriding the generator torque setpoint altered the rotational speed of the generator further comprises:
    reducing the torque setpoint of the generator so as to facilitate an increase in the rotational speed of the generator, wherein increasing the rotational speed of the generator facilitates increasing the traction of the slip coupling.

20. The system of claim 13, wherein increasing the traction of the slip coupling further comprises:

increasing the rotational speed of the generator by motoring the generator.

* * * * *